United States Patent [19]

Keijsper et al.

[11] Patent Number: 5,008,094

[45] Date of Patent: Apr. 16, 1991

[54] CRYSTALLINE (METALLO)SILICATES AND PROCESS FOR PREPARING SUCH (METALLO)SILICATES

[75] Inventors: Johannes J. Keijsper; Munro Mackay; Martin F. M. Post, all of Amsterdam, Netherlands

[73] Assignee: Shell Oil Company, Houston, Tex.

[21] Appl. No.: 399,189

[22] Filed: Aug. 28, 1989

[30] Foreign Application Priority Data

Sep. 9, 1988 [GB] United Kingdom ............... 8821237

[51] Int. Cl.$^5$ .............................................. C01B 33/34
[52] U.S. Cl. ..................................... 423/328; 502/77; 208/46
[58] Field of Search ............. 423/326, 328, 329, 330, 423/277, 279; 502/60, 62, 77, 64; 208/46

[56] References Cited

U.S. PATENT DOCUMENTS

| | | | |
|---|---|---|---|
| 3,904,738 | 9/1975 | Robson | 423/329 |
| 4,187,283 | 2/1980 | Kokotailo et al. | 423/328 |
| 4,287,166 | 9/1981 | Dwyer et al. | 423/328 |
| 4,524,140 | 6/1985 | Chang et al. | 502/61 |

OTHER PUBLICATIONS

Selbin et al., "Preparation of Gallium–Containing Molecular Sieves", J. Inorg. Nucl. Chem., vol. 20 (1961) pp. 222–228.

H. Kacirek and H. Lechert, ACS Symposium 1977, 40, 224–257, Ed. J. R. Katzer.

*Primary Examiner*—W. J. Shine
*Assistant Examiner*—R. Bruce Breneman

[57] ABSTRACT

Crystalline (metallo)silicates having in the as-synthesized, anhydrous form a molar composition expressed by the formula:

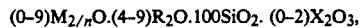

$$(0-9)M_{2/n}O \cdot (4-9)R_2O \cdot 100SiO_2 \cdot (0-2)X_2O_3,$$

wherein M is an alkali or alkaline earth metal ion having a valency n, R represents a tetramethylammonium cation or a precursor thereof, X represents at least one of Al, Fe, B or Ga, and having a specific X-ray diffraction pattern.

The silicates can be prepared from an aqueous mixture comprising a source of silicon, optionally a source of at least one of aluminium, iron boron or gallium, and a source of tetramethylammonium cations or precursors thereof, which mixture is kept at a temperature of between 140°–240° C. whereby the following requirement is fulfilled: $T \geq 244.5 - 18.2 \ln t$, wherein T is the temperature (in °C.) and t is the period of time (in hours) during which the mixture is kept at temperature T, until a crystalline silicate is formed which is subsequently separated from the mother liquor and dried, and which may subsequently be calcined.

12 Claims, No Drawings

CRYSTALLINE (METALLO)SILICATES AND PROCESS FOR PREPARING SUCH (METALLO)SILICATES

FIELD OF THE INVENTION

The present invention relates to novel crystalline (metallo)silicates, a process for preparing such (metallo)silicates.

BACKGROUND OF THE INVENTION

In general, crystalline aluminosilicates in both natural and synthetic forms, often referred to as zeolites, are of particular interest since they find wide and promising application in industry as, for instance, catalyst carriers or catalysts in various types of hydroconversion processes.

It has now been found that novel synthetic crystalline (metallo)silicates can be prepared from reaction mixtures wherein the various components are present in defined molar ratios and use is made of a specific organic nitrogen-containing cation.

SUMMARY OF THE INVENTION

Crystalline (metallo)silicates having in the as-synthesized, anhydrous form a molar composition expressed by the formula:

$$(0-9)M_{2/n}O \cdot (4-9)R_2O \cdot 100SiO_2 \cdot (0-2)X_2O_3,$$

wherein M is an alkali or alkaline earth metal ion having a valency n, R represents a tetramethylammonium cation (including precursors thereof), X represents at least one of Al, Fe, B or Ga, and having a specific X-ray diffraction pattern.

The silicates can be prepared from an aqueous mixture comprising a source of silicon, optionally a source of at least one of aluminium, iron, boron or gallium, and a source of tetramethylammonium cations or precursors thereof, which mixture is kept at a temperature of between 140°–240° C. whereby the following requirement is fulfilled: $T \geq 244.5 - 18.2 \ln t$, wherein T is the temperature (in °C.) and t is the period of time (in hours) during which the mixture is kept at temperature T, until a crystalline silicate is formed which is subsequently separated from the mother liquor and dried, and which may subsequently be calcined.

The above described silicates may be calcined to produce crystalline (metallo)silicates having in the R$_2$O-free form a molar composition expressed by the formula:

$$(0-9)M_{2/n}O \cdot 100SiO_2 \cdot (0-2)X_2O_3,$$

wherein M, n and x having the meanings as described hereinabove.

DETAILED DESCRIPTION OF THE INVENTION

The present invention thus relates to crystalline (metallo)silicates having in the as-synthesized, anhydrous form a molar composition expressed by the formula:

$$(0-9)M_{22/n}O \cdot (4-9)R_2O \cdot 100SiO_2 \cdot (0-2)X_2O_3$$

wherein M represents an alkali or alkaline earth metal ion of valency n, R represents a tetramethylammonium cation (TMA) (including precursors thereof), X represents at least one of Al, Fe, B or Ga, and having an X-ray diffraction pattern containing at least the following lines:

| d(Å) | Intensity |
| --- | --- |
| 10.27 ± 0.2 | s–vs |
| 4.89 ± 0.1 | w–m |
| 4.18 ± 0.1 | m |
| 3.85 ± 0.1 | m |
| 3.82 ± 0.1 | w–m |
| 3.62 ± 0.1 | w–m |
| 3.48 ± 0.1 | m–vs |
| 3.32 ± 0.05 | w–m |
| 3.23 ± 0.05 | w–m | vs = very strong
s = strong
m = medium
w = weak

The present invention in particular relates to crystalline (metallo)silicates as described hereinabove having in the as-synthesized, anhydrous form a molar composition expressed by the formula:

$$(0-3)M_{2/n}O \cdot (4.5-6.5)R_2O \cdot 100SiO_2 \cdot (0-1)X_2O_3,$$

wherein M, n, R and X are as defined hereinbefore.

In particular, the present invention relates to crystalline (metallo)silicates as described hereinabove wherein X represents aluminium.

As alkali metal ion preferably a sodium ion is present in the crystalline (metallo)silicates according to the present invention.

The crystalline (metallo)silicates according to the present invention can be subjected to a treatment after which zeolites with a reduced amount of R$_2$O or even in the R$_2$O-free form are obtained. Suitably, the crystalline (metallo)silicates according to the present invention are subjected to calcination in order to obtain stable, crystalline, hydrophobic and microporous materials.

Therefore, the present invention also relates to crystalline (metallo)silicates having in the R2O-free form a molar composition expressed by the formula:

$$(0-9)M_{2/n}O \cdot 100SiO_2(0-2l)X_2O_3,$$

wherein M, n and X have the meanings as described hereinabove, and having an X-ray diffraction pattern containing at least the following lines:

| d(Å) | Intensity |
| --- | --- |
| 8.99 ± 0.2 | vs |
| 6.72 ± 0.1 | m |
| 4.40 ± 0.1 | w |
| 4.29 ± 0.1 | w–m |
| 3.85 ± 0.1 | w |
| 3.77 ± 0.1 | w |
| 3.42 ± 0.1 | w–m |
| 3.29 ± 0.05 | w |
| 3.26 ± 0.05 | w |
| 3.22 ± 0.05 | w | vs = very strong
m = medium
w = weak

Preferably, the crystalline (metallo)silicates in the R2O-free form according to the present invention have a molar composition expressed by the formula:

$$(0-3)M_{2/n}O \cdot 100SiO_2 \cdot (0-1)X_2O_3,$$

The crystalline (metallo)silicates according to the present invention can also suitably be subjected to a (partial) substitution of at least one of Al, Fe, B or Ga, e.g. a so-called remetallization treatment, wherein an (additional) amount of at least one of Al, Fe, B or Ga can be added to crystalline (metallo)silicates according to the present invention. In this context reference can be made to U.S. Pat. No. 4,524,140, issued June 18, 1985, incorporated by reference herein.

The present invention therefore further relates to crystalline (metallo)silicates in the $R_2O$-free form as described hereinabove containing an additional amount of at least one of Al, Fe, B or Ga.

Preferably, the crystalline (metallo)silicates containing in the $R_2O$-free form an additional amount of X have a molar composition expressed by the formula:

$$(0-9)M_{2/n}O.100SiO_2.(0.1-5)X_2O_3$$

The present invention also relates to a process for preparing crystalline (metallo)silicates in the as-synthesized, anhydrous form as defined hereinabove, which comprises maintaining an aqueous mixture comprising a source of silicon, optionally a source of at least one of aluminium, iron, boron or gallium, a source of an alkali or alkaline earth metal (M) and a source of tetramethyl ammonium cations or precursors thereof at a temperature between 140°-240° C. whereby the following requirement is fulfilled., $T \geq 244.5 - 18.2 \ln t$, wherein T is the temperature (in °C.) and t is the period of time (in hours) during which the mixture is kept at temperature T, until a crystalline material is produced which is subsequently separated from the mother liquor and dried, in which mixture the various components are initially present in the following molar ratios:

$X_2O_3:SiO_2 = 0-0.03$
$OH^-:SiO_2 = 0.1-1.1$
$H_2O:SiO_2 = 5-30$
$R:SiO_2 > 0.25$
$M:SiO_2 = 0-1.0$

The expression $OH^-$ as used herein comprises hydroxyl ions added to the forming solution originating from both the source of tetramethyl ammonium hydroxide or precursors thereof and the appropriate metal hydroxide(s).

The crystalline (metallo)silicates according to the present invention are preferably prepared from an aqueous mixture as described hereinabove wherein the various components are initially present in the following molar ratios:

$X_2O_3:SiO_2 = 0-0.02$
$OH:SiO_2 = 0.2-0.8$
$H_2O:SiO_2 = 10-25$
$R:SiO_2 = 0.5-1.0$
$M:SiO_2 = 0-0.5$

Normally, the novel crystalline (metallo)silicates will be produced when the reaction mixture has been maintained under the appropriate conditions and for a sufficient period of time fulfilling the above defined requirement.

The preparation of the crystalline (metallo)silicates according to the present invention is preferably carried out by maintaining the aqueous mixture at a temperature of between 160°-200° C., for a period of at least 110 hours.

Suitably, the reaction mixture is agitated by stirring during the preparation. The process according to the present invention can be carried out either at autogeneous pressure or at a more elevated pressure. The crystalline product obtained can suitably be calcined at a temperature of between 500°-800° C. Preferably, tetramethylammonium hydroxide is used as source of tetramethylammonium cations.

Examples of suitable silicon, aluminium, iron, boron or gallium sources comprise amorphous solid silicas, silica sols, silica gels and siliceous acid; aluminium hydroxide, aluminium alkoxides, aluminium sulphate, gamma-alumina and preferably sodium aluminate; iron nitrates, boric acid and boron oxide; gallium nitrate and freshly prepared gallium hydroxide.

Examples of suitable alkali or alkaline earth metal ion sources which can be used in the preparation of the crystalline (metallo)silicates according to the present invention comprise the appropriate nitrates, carbonates, hydroxides and oxides. Preferably, a sodium compound in particular sodium hydroxide is used as source of alkali metal ions.

The novel (metallo)silicates according to the present invention can suitably be used as molecular sieves, membranes, or as catalysts or catalyst carriers in the operation of various catalytic processes.

If desired, one or more compounds having catalytic activity, in particular one or more salts of metals of Group IVB, VIB, VIIB or VIII as well as ammonium ions and/or protons, can be incorporated into the crystalline (metallo)silicates according to the present invention. They can be incorporated by well-known techniques such as, for example, impregnation and ion-exchange.

If, the (metallo)silicates according to the present invention have been used as catalyst or catalyst carrier they may be exposed to any regeneration method known in the art.

The ranges and limitations provided in the instant specification and claims are those which are believed to particularly point out and distinctly claim the instant invention. It is, however, understood that other ranges and limitations that perform substantially the same function in substantially the same way to obtain the same or substantially the same result are intended to be within the scope of the instant invention as defined by the instant specification and claims.

The invention will be described by the following examples which are provided for illustration purposes and are not to be construed as limiting the invention.

EXAMPLE 1

A crystalline aluminosilicate according to the present invention was prepared by mixing in the appropriate amounts an aqueous mixture of silicasol, NaOH, NaAlO₂, tetramethylammonium hydroxide (TMAOH) and tetramethylammonium chloride (TMACl) in water until a homogeneous gel was obtained. The molar composition of the aqueous mixture was as follows:

$$25SiO_2.0Al_2O_3.5TMA_2O.5TMACl.2.5Na_2O.4.00/H_2O$$

The gel obtained was subsequently kept at 190° C. for a period of 64 hours in a stirred autoclave.

After synthesis the solid product (SCS-5) was separated by filtration, water washed, and dried at 120° C. In the as-synthesized form the material contained 38.7% w Si, 0.1% w Al, 7.6% w C, 2.7% w H, and 2.3% w N.

Its X-ray diffraction pattern contained at least the lines as given in Table I.

TABLE I

| d(A) | Intensity |
| --- | --- |
| 10.37 ± 0.2 | vs |
| 4.89 ± 0.1 | m |
| 4.34 ± 0.1 | w |
| 4.18 ± 0.1 | m |
| 3.93 ± 0.1 | w |
| 3.85 ± 0.1 | m |
| 3.82 ± 0.1 | w |
| 3.62 ± 0.1 | w |
| 3.48 ± 0.1 | m |
| 3.38 ± 0.05 | w |
| 3.32 ± 0.05 | w |
| 3.23 ± 0.05 | w |

Subsequently the crystalline product obtained was calcined in air at 550° C. for a period of 16 hours, and has an X-ray diffraction pattern containing at least the lines as given in Table II.

TABLE II

| d(A) | Intensity |
| --- | --- |
| 8.88 ± 0.2 | vs |
| 6.71 ± 0.1 | m |
| 4.40 ± 0.1 | w |
| 4.29 ± 0.1 | m |
| 3.85 ± 0.1 | w |
| 3.77 ± 0.1 | w |
| 3.42 ± 0.1 | m |
| 3.29 ± 0.05 | w |
| 3.26 ± 0.05 | w |
| 3.22 ± 0.05 | w |

EXAMPLE 2

An experiment has been carried out in a substantially analogous manner as described in Example 1, except that the mixture was kept at 170° C. for a period of 120 hours and that the reaction mixture had the following molar composition: $10SiO_2.8TMAOH.200H_2O$.

The product obtained was a crystalline product of the silicate type containing in the as-synthesized form 39.0% w Si, less than 0.5% w Al, 7.6% w C, 2.6% w H, and 2.1% w N.

Its X-ray diffraction pattern contained at least the lines as given in Table III.

TABLE III

| d(A) | Intensity |
| --- | --- |
| 10.34 ± 0.2 | s |
| 6.43 ± 0.1 | m |
| 4.87 ± 0.1 | w |
| 4.36 ± 0.1 | m |
| 4.34 ± 0.1 | m |
| 4.23 ± 0.1 | m |
| 4.17 ± 0.1 | m |
| 3.92 ± 0.1 | m |
| 3.82 ± 0.1 | m |
| 3.65 ± 0.1 | w |
| 3.61 ± 0.1 | m |
| 3.53 ± 0.1 | m |
| 3.48 ± 0.1 | vs |
| 3.30 ± 0.05 | m |
| 3.21 ± 0.05 | m |

COMPARATIVE EXAMPLE A

An experiment was been carried out by mixing an aqueous mixture having a molar composition: $10SiO_2.0TMAOH.150H_2O$. This mixture was kept under stirring at 150° C. for a period of 72 hours. After cooling, a crystalline compound of different nature was obtained having an X-ray diffraction pattern containing at least the following lines as given in Table IV.

TABLE IV

| d(A) | Intensity |
| --- | --- |
| 13.8 ± 0.2 | vs |
| 4.8 ± 0.1 | m |
| 3.8 ± 0.1 | m |
| 3.40 ± 0.05 | m |
| 2.70 ± 0.05 | m |

COMPARATIVE EXAMPLE B

An experiment has been carried out in a substantially analogous manner as described in Example 2, except that the reaction mixture had the following molar composition:

$10SiO_2 0.7O.72.8TMAOH.250H_2O$.

The product obtained was a crystalline aluminium silicate of the sodalite type.

COMPARATIVE EXAMPLE C

An experiment has been carried out in a substantially analogous manner as described in Example 2, except that the reaction mixture had the following molar composition:

$10SiO_2 1.5TMAOH.250H_2O$.

The product obtained was a crystalline silicate of the ZSM-39 type.

It is apparent from the result of the experiments described hereinabove that products according to the present invention are prepared when the specific requirements of the process according to the present invention are fulfilled. If, preparations are carried out under even slightly deviating conditions undesired products are obtained.

We claim:

1. A crystalline (metallo)silicates having in the as-synthesized, anhydrous form a molar composition expressed by the formula:

$(0-9)M_{2/n}O.(4-9)R_2).100SiO_2.(0-2)Al_2O_3$, wherein M represents an alkali or alkaline earth metal ion of valency n R represents a tetremthylammonium cation, and having an X-ray diffraction pattern containing at least the following lines:

| d(A) | Intensity |
| --- | --- |
| 10.27 ± 0.2 | s-vs |
| 4.89 ± 0.1 | w-m |
| 4.18 ± 0.1 | m |
| 3.85 ± 0.1 | m |
| 3.82 ± 0.1 | w-m |
| 3.62 ± 0.1 | w-m |
| 3.48 ± 0.1 | m-vs |
| 3.32 ± 0.05 | w-m |
| 3.23 ± 0.05 | w-m |

2. The crystalline (metallo)silicates according to claim 1 having in the as-synthesized, anhydrous form the formula:

$(0-3)M_{2/n}O.(4.5-6.5)R_2O100SiO_2.(0-1)Al_2O_3$.

3. The crystalline (metallo)silicates according to claim 1 or 2, wherein m represents a sodium ion.

4. The crystalline (metallo)silicates according to claim 11 having in $R_2O$-free form the formula:

$$(0-9)M_{2/n}O.100SiO_2.(0-2)Al_2O_3,$$

and having a X-ray diffraction pattern containing at least the following lines:

| d(A) | Intensity |
|---|---|
| 8.99 ± 0.2 | vs |
| 6.72 ± 0.1 | m |
| 4.40 ± 0.1 | w |
| 4.29 ± 0.1 | w-m |
| 3.85 ± 0.1 | w |
| 3.77 ± 0.1 | w |
| 3.42 ± 0.1 | w-m |
| 3.29 ± 0.05 | w |
| 3.26 ± 0.05 | w |
| 3.22 ± 0.05 | w |

5. The crystalline (metallo)silicates according to claim 2 having in $R_2O$-free form the formula:

$$(0-3)M_{2/n}O.100SiO_2.(0-1)Al_2O_3,$$

and having an X-ray diffraction pattern containing at least the following lines:

| d(A) | Intensity |
|---|---|
| 8.99 ± 0.2 | vs |
| 6.72 ± 0.1 | m |
| 4.40 ± 0.1 | w |
| 4.29 ± 0.1 | w-m |
| 3.85 ± 0.1 | w |
| 3.77 ± 0.1 | w |
| 3.42 ± 0.1 | w-m |
| 3.29 ± 0.05 | w |
| 3.26 ± 0.05 | w |
| 3.22 ± 0.05 | w |

6. The crystalline (metallo)silicates according to any one of claims 1, 2, 3, 4 or 5 wherein one or more catalytically active compounds have been incorporated.

7. The crystalline (metallo)silicates according to claim 6, wherein the catalytically active compounds comprise one or more salts of metals selected from the group consisting of Group IVB, VIB, VIIB or VIII.

8. A process for preparing (metallo)silicates which comprises maintaining an aqueous mixture comprising a source of silicon, optionally a source of aluminum, a source of an alkali or alkaline earth metal (M) and a source of tetramethyl ammonium cations or precursors thereof at a temperature of between 140°-240° C. whereby the following requirement is fulfilled: $T \geq 244.5-18.2 \ln t$, wherein T is the temperature (in °C.) and t is the period of time (in hours) during which the mixture is kept at temperature T, until a crystalline material is produced which is subsequently separated from the mother liquor and dried, in which mixture the various components are initially present in the following molar ratios:

$Al_2O_3:SiO_2=0-0.03$
$OH^-:SiO_2=0.1-1.1$
$H_2O:SiO_2=5-30$
$R:SiO_2>0.25$
$M:SiO_2>0-1.0$

9. The process according to claim 8, wherein the various components in the mixture are initially present in the following molar ratios:

$Al_2O_3:SiO_2=0-0.02$
$OH^-:SiO_2=0.2-0.8$
$H_2O:SiO_2=10-25$
$R:SiO_2=0.5-10$
$M:SiO_2=0-0.5$

10. The process according to claim 8 or 9, wherein the mixture is maintained at a temperature of between 160°-200° C., for a period of at least 110 hours.

11. The process according to claim 8 or 9, wherein the mixture is stirred.

12. The process according to any one of claims 8 or 9, wherein the product obtained is calcined at a temperature of between 500°-800° C.

* * * * *